Patented Dec. 28, 1926.

1,612,598

UNITED STATES PATENT OFFICE.

LEONARD ANDERSON, OF NOTTINGHAM, ENGLAND, ASSIGNOR TO BOOTS PURE DRUG COMPANY LIMITED, OF NOTTINGHAM, ENGLAND.

MANUFACTURE OF SUGAR DERIVATIVES OF 3.3'-DIAMINO-4.4'-DIHYDROXYARSENO-BENZENE.

No Drawing. Application filed February 18, 1921, Serial No. 446,131, and in Great Britain January 7, 1921.

This invention relates to the manufacture of derivatives of 3.3'-diamino-4.4'-dihydroxyarsenobenzene or the like for use in the cure or alleviation of disease.

With preparations of the kind referred to as heretofore produced considerable difficulty has been experienced in the administration thereof for remedial purposes owing to its ready disposition to oxidation and decomposition. Thus while not preventing its use recourse to extensive precautionary measures has been nevertheless required. Hence the great difficulty that has attended its adoption in general medical practice.

The particular object of the present invention is to provide a preparation of a neutral water soluble derivative of the 3.3'-diamino-4.4'.-dihydroxyarsenobenzene with glucose which will be practically stable and not readily oxidizable under exposure or when subject to atmospheric influences. In connection with the preparation of stable derivatives of the 3.3'-diamino-4.4'-dihydroxyarsenobenzene I am aware of the proposal to dissolve the soluble acid salts of the arseno compounds in solutions of reducing sugars (preferably glucose) to effect a hindrance to oxidation of the molecule of the arseno compound the said solution being prepared out of contact with the air and filled into ampules and protected from the light. Also of the proposal to use a solution of an alkali metal salt of dihydroxydiaminoarsenobenzene in water with a polyvalent alcohol and precipitate with alcohol and ether for producing intimate mixtures but these methods do not result in a product which is neutral in reaction and soluble in water.

Now according to the present invention the neutral water soluble derivative or compound of 3.3'-diamino-4.4'-dihydroxyarsenobenzene and glucose having the properties or attributes hereinbefore referred to while being free from the disadvantages attending the use of the preparations heretofore adopted or proposed may be prepared by the following method.

For purposes of description the 3.3'-diamino-4.4'-dihydroxyarsenobenzene will be referred to hereinafter as the "base".

Thus 10 grams of the "base" are dissolved in 14 c. c. 4 N. caustic soda and 100 c. c. 50% glucose solution added.

The glucose solution is prepared by dissolving sufficient pure glucose in distilled water to give approximately a 50% solution; thus the said glucose solution may be prepared by dissolving 50 grams pure glucose in 100 grams water.

The ingredients comprising the dissolved "base" and glucose solution are thoroughly mixed and allowed to stand for several hours until combination is complete.

The solution is then neutralized with hydrochloric acid preferably pure concentrated hydrochloric acid and, if necessary, filtered; the resultant solution containing a compound of the "base" and glucose and some uncombined glucose.

This resultant solution, separated in any appropriate or known manner, may be diluted to any required extent, and is then in condition for use.

The compound of glucose and "base" does not necessarily require to be isolated, but, if desired, it may be precipitated by the use or application of organic liquids, such for instance as alcohol, acetone and the like the product being a light yellow powder soluble in water with a neutral reaction. This product is also insoluble in acetone, insoluble in strong alcohol and insoluble in ether. Tests with diazotizing agents indicate that the compound has no free amino groups. It is rapidly decomposed by acids into glucose and the corresponding salt of salvarsan. Sulphuric acid effects the hydrolysis most quickly. After hydrolysis diazotization may be effected by the usual methods. Alkalis diminish the stability of the solution of the compound as indicated by the rapid darkening of color. Excellent therapeutic results are obtainable however with the glucose compound solution direct.

I claim:

1. The herein described manufacture of a neutral water soluble compound or derivative of the "base" 3.3'-diamino-4.4'-dihydroxyarsenobenzene and a glucose which consists in reacting upon the base with the glucose in the presence of an alkali, and allowing the mixture to stand until the reaction is complete.

2. The herein described manufacture of derivatives of the base 3.3'-diamino-4.4'-dihydroxyarsenobenzene which consists in effecting reaction between the aforesaid base and glucose solution by dissolving 10 grams of the "base" in 14 c. c. 4 N. caustic soda and then adding to the resulting solution of said base 100 c. c. of 50% glucose solution, thoroughly mixing these ingredients and allowing the same to stand for a sufficient length of time to effect reaction and complete combination.

3. The herein described manufacture of derivatives of the base 3.3'-diamino-4.4'-dihydroxyarsenobenzene which consists in effecting reaction between the aforesaid base and glucose solution by dissolving 10 grams of the "base" in 14 c. c. 4 N. caustic soda, then adding to the resulting solution of said base 100 c. c. of 50% glucose solution, thoroughly mixing these ingredients and allowing the same to stand for a sufficient length of time to effect reaction and complete combination and then neutralizing the resultant mixture with hydrochloric acid.

4. The herein described manufacture of derivatives of the base 3.3'-diamino-4.4'-dihydroxyarsenobenzene which consists in effecting reaction between the aforesaid base and glucose solution by dissolving 10 grams of the base in 14 c. c. 4 N. caustic soda, then adding to the resulting solution of said base 100 c. c. of 50% glucose solution, thoroughly mixing these ingredients and allowing the same to stand for a sufficient length of time to effect reaction and complete combination, then neutralizing the resultant mixture with hydrochloric acid and ultimately filtering the mixture.

5. The herein described manufacture of derivatives of the base 3.3'-diamino-4.4'-dihydroxyarsenobenzene which consists in effecting reaction between the aforesaid base and glucose solution by dissolving the "base" in caustic soda and adding to the solution of said base a glucose solution, thoroughly mixing these ingredients and allowing the same to stand for a sufficient length of time to effect reaction and complete combination and then precipitating by means of alcohol.

6. The herein described manufacture of derivatives of the base 3.3'-diamino-4.4'-dihydroxyarsenobenzene which consists in effecting reaction between the aforesaid base and glucose solution by dissolving 10 grams of the base in 14 c. c. 4 N. caustic soda, then adding to the resulting solution, of said base 100 c. c. of 50% glucose solution, thoroughly mixing these ingredients and allowing the same to stand for a sufficient length of time to effect reaction and complete combination and then precipitating by means of alcohol.

7. The herein described manufacture of derivatives of the base 3.3'-diamino-4.4'-dihydroxyarsenobenzene which consists in effecting reaction between the aforesaid base and glucose solution by dissolving 10 grams of the "base" in 14 c. c. 4 N. caustic soda, then adding to the resulting solution of said base 100 c. c. of 50% glucose solution, thoroughly mixing these ingredients and allowing the same to stand for a sufficient length of time to effect reaction and complete combination, then neutralizing the resultant mixture with hydrochloric acid and ultimately precipitating by means of alcohol.

8. The herein described manufacture of derivatives of the base 3.3'-diamino-4.4'-dihydroxyarsenobenzene which consists in effecting reaction between the aforesaid base and glucose solution by dissolving 10 grams of the base in 14 c. c. 4 N. caustic soda, then adding to the resultant solution of said base 100 c. c. of 50% glucose solution, thoroughly mixing these ingredients and allowing the same to stand for a sufficient length of time to effect reaction and complete combination, then neutralizing the resultant mixture with hydrochloric acid, then filtering the mixture and ultimately precipitating by means of alcohol.

9. The herein described manufacture of derivatives of the base 3.3'-diamino-4.4'-dihydroxyarsenobenzene which consists in effecting reaction between the aforesaid "base" and glucose solution by dissolving the base in caustic soda and adding to the resulting solution of said base a glucose solution, thoroughly mixing these ingredients and allowing the same to stand for a sufficient length of time to effect reaction and complete combination, then neutralizing the resultant mixture with hydrochloric acid and ultimately filtering the mixture.

10. The herein described manufacture of derivatives of the base 3.3'-diamino-4.4'-dihydroxyarsenobenzene which consists in effecting reaction between the aforesaid "base" and glucose solution by dissolving the base in caustic soda and adding to the resulting solution of said base a glucose solution, thoroughly mixing these ingredients and allowing the same to stand for a sufficient length of time to effect reaction and complete combination, then neutralizing the resulting mixture with hydrochloric acid, then filtering the mixture and finally precipitating by means of alcohol.

11. In the preparation of a neutral water soluble compound of the base 3.3'-diamino-4.4'-dihydroxyarsenobenzene and glucose, the herein described process which consists in preparing a soluble salt of the base by dissolving the latter in an alkali, then thoroughly mixing a glucose solution with the solution of alkali and base and allowing the mixture to stand for several hours during which the aforesaid base and glucose solution completely re-act and combine.

12. The herein described process for the preparation of the neutral water soluble compound of the base 3.3'-diamino-4.4'-dihydroxyarsenobenzene and glucose which consists in preparing a soluble salt of the base by dissolving said base in an alkali, then thoroughly mixing a glucose solution with the solution of alkali and base and allowing the mixture to stand for several hours during which the aforesaid base and glucose solution completely re-act and combine and then after combination is completed, neutralizing the alkali with an acid.

13. The herein described process for the preparation of the neutral water soluble compound of the base 3.3'-diamino-4.4'-dihydroxyarsenobenzene and glucose which consists in preparing a soluble salt of the base by dissolving said base in caustic soda, then thoroughly mixing a glucose solution with the solution of caustic soda and base and allowing the mixture to stand for several hours during which the aforesaid base and glucose solution completely re-act and combine.

14. The herein described process for the preparation of the neutral water soluble compound of the base 3.3'-diamino-4.4'-dihydroxyarsenobenzene and glucose which consists in preparing a soluble salt of the base by dissolving said base in caustic soda, then thoroughly mixing a glucose solution with the solution of caustic soda and base and allowing the mixture to stand for several hours during which the aforesaid base and glucose solution completely re-act and combine, and then, after combination is completed, neutralizing the caustic soda with hydrochloric acid.

15. A neutral water soluble compound or derivative of 3.3'-diamino-4.4'-dihydroxyarsenobenzene which may be formed by reacting upon the same with glucose in the presence of an alkali, and which will be practically stable and unoxidizable under exposure to atmospheric influences.

16. The method of treating an alkaline solution of dihydroxydiaminoarsenobenzene by means of glucose to obtain a stable soluble base.

17. The method of treating an alkaline solution of dihydroxydiaminoarsenobenzene by means of glucose to obtain a stable soluble base.

18. The process for the manufacture of water soluble, neutral derivatives of dihydroxydiaminoarsenobenzene which consists in allowing an alkaline solution of dihydroxydiaminoarsenobenzene to act upon the aqueous solution of glucose and in precipitating the product thus obtained with a large excess of an organic fluid which mixes with water and does not dissolve the compound.

19. As a new product, a glucose derivative of dihydroxy-diamino-arsenobenzene, consisting of a light yellow amorphous powder readily soluble in water and having therapeutic value.

20. The product obtained by treating an alkaline solution of dihydroxydiaminoarsenobenzene with a glucose.

Signed at Nottingham, England, this 27th day of January, 1921.

LEONARD ANDERSON.